United States Patent [19]

Grimmer

[11] 4,447,564
[45] May 8, 1984

[54] REACTIVE RESIN COMPOSITIONS AND MOLDED SUBSTANCES MADE THEREFROM

[75] Inventor: Rudolf Grimmer, Erlangen, Fed. Rep. of Germany

[73] Assignee: Siemens Aktiengesellschaft, Munich, Fed. Rep. of Germany

[21] Appl. No.: 425,904

[22] Filed: Sep. 28, 1982

[30] Foreign Application Priority Data

Oct. 22, 1981 [DE] Fed. Rep. of Germany ....... 3141955

[51] Int. Cl.³ .............................................. C08K 3/26
[52] U.S. Cl. ................... 523/200; 523/451; 523/453; 523/455; 523/457; 523/440
[58] Field of Search .............. 523/200, 440, 455, 457, 523/451, 453

[56] References Cited

U.S. PATENT DOCUMENTS

| 2,841,504 | 7/1958 | Liggett | 523/200 |
| 3,314,912 | 4/1967 | Bean et al. | 523/451 |
| 3,468,839 | 9/1969 | Millane | 523/457 |

FOREIGN PATENT DOCUMENTS

| 666517 | 7/1963 | Canada | 523/200 |
| 51-46343 | 4/1976 | Japan | 523/457 |
| 56-88449 | 7/1981 | Japan | 523/200 |
| 1009198 | 11/1965 | United Kingdom | 523/457 |

*Primary Examiner*—Lewis T. Jacobs
*Attorney, Agent, or Firm*—Kenyon & Kenyon

[57] ABSTRACT

The compositions are anhydride-hardened epoxy resins which are filled with calcium-magnesium or calcium carbonate particles having a coating of a multibasic organic or inorganic acid bonded to the surfaces of the particles. Castings or moldings made therefrom, particularly electrical parts for $SF_6$ technology, exhibit improved mechanical properties such as bending strength and impact strength.

10 Claims, No Drawings

REACTIVE RESIN COMPOSITIONS AND MOLDED SUBSTANCES MADE THEREFROM

BACKGROUND OF THE INVENTION

The present invention relates to reactive resin compositions of the anhydride-hardened epoxy resin filled with particulate carbonate-salts and molded materials made therefrom.

When casting extended resinous parts, the filler used often is not quartz particles but is milled calcium-magnesium carbonate or milled calcium carbonate. One reason for such use is that moldings filled with calcium-magnesium carbonates are more stable in the presence of $SF_6$ decomposition products. A further advantage of calcium-magnesium carbonate and also of calcium carbonate over quartz particles is their lesser abrasive action. This has distinct advantage in processing resin parts by casting as well as in the machining of parts. Carbonate-filled moldings, however, do exhibit disadvantage over those which are filled with quartz particles. The molding mechanical properties such as bending strength or impact strength are about fifty percent lower when carbonate fillers are used.

SUMMARY OF THE INVENTION

It is an object of the present invention, therefore, to make reactive resin compositions which are filled with carbonate particles and have mechanical properties equivalent to resin compositions filled with quartz particles. A further object is the preparation of a strong filled resin composition which is easy to machine.

These and other objects are achieved by the invention, which is directed to a filled, hardened resin composition. The composition comprises an epoxy resin interbonded with an anhydride hardener and in a matrix with carbonate salt filler particles having a coating of a multibasic organic or inorganic acid bonded to the filler particle surfaces. The filler particles are precoated with the acid and processed so that bonding between the filler and the coating takes place. In this manner, filler particles of carbonate salts of calcium and/or magnesium are treated with compounds such as acids which react with the surface of the carbonate and set i.e. bond. The treated filler particles can be mixed homogenously with epoxy resin and hardeners at a temperature of 60° to 150° c., and the resulting reactive mixtures can be processed to produce moldings by allowing the hardening reaction to occur and by adding the customary accelerators.

DETAILED DESCRIPTION OF THE INVENTION

The filled resin compositions of the invention have improved mechanical properties such as stiffness, hardness and dimensional stability when compared with similar filled resins without the filler coating. This improvement is believed to be the result of improved adhesion of the hardened resin to the filler particles. The adhesion is produced by interbond formation between the filler particle coating and the hardened resin. Thus, the coating acts as an interbonding link joining the hardened resin and filler together in a matrix arrangement.

The combination of epxoy resin, anhydride hardener and carbonate salt filler is known in the art. The properties of these ingredients will be adjusted according to known procedures to produce the desired properties of the resulting filled hardened resin. Primarily, this will depend upon the ratio of filler to hardened resin which in general will be more than about 0.1:1 and preferably will be in the range of about 1:1 to 3:1. A sufficient amount of hardener will be used according to known formulations to obtain the desired hardening of the unreacted epoxy resin. Accordingly, the ratios and amounts of resin, hardener and filler which are useful for the invention are those known in the art.

In general, the use of multibasic acids as filler coatings in the compositions of the invention will result in mechanical strength increases of up to thirty percent. Equally good results can be obtained with coatings of organic hydroxy acids and amino acids. For example, with hydroxy di- and tri-carboxylic acids, thirty five percent increase in the stiffness, hardness and dimensional stability can be achieved.

Any multibasic organic or inorganic acid which will react with carbonate salt particles to form a bonded coating will function in the invention. Suitable multibasic inorganic acids are, for example, phosphoric, sulfuric and boric acid. Maleic, succinic, fumaric, cyclohexanedicarboxylic acid adipinic acid are suitable as multibasic organic acids. Suitable organic hydroxy acids are, for example, hydroxy benzoic acids, 2-hydroxyethane sulfonic acid, tartaric acid, tartronic acid and glycolic acid, as well as mannitol and particularly malic and citric acid. Suitable multibasic amino acids are, for example, asparagine, glutamine, sulfanil and aminobenzoic acids and taurine.

Numerous anhydride hardeners for epoxy resins are known. Typically, they will include difunctional organic carboxylic acids. Suitable anhydride hardeners which are used preferably, are phthalic acid anhydride, tetrahydrophthlic acid anhydride and hexahydrophthalic acid anhydride.

The epoxy resins will generally be a combination of an epoxide monomer and another monomer such as bisphenol methane, hydantoin, formaldehyde, diglycidyl ester and similar difunctional organic compounds. The epoxy bisphenol methane resins include polyepoxy compounds which contain more than one 1,2-epoxy group in the molecule and which can be reacted to form a molding with the foregoing hardeners or hardener mixtures. Such suitable epoxy resins correspond to the general formula

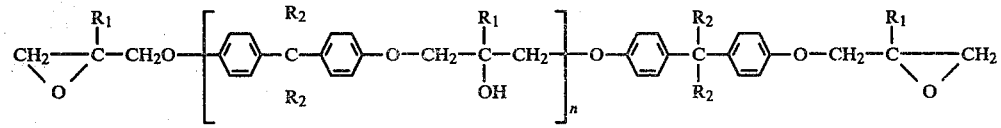

where the radical $R_1$ is H; $R_2$ is $CH_3$ or H; and n is a whole number from 0 to 20. In unfilled, unhardened condition they have a viscosity of 10,000 to 15,000 mPas at 25° C. and an epoxy equivalent (EV) of 170 to 500. Such a resin can be prepared by known methods from bisphenol A and epichlorohydrin.

Further suited are epoxy resins of the hydantoin, formaldehyde-phenol mixtures such as novolak, diglycidyl ester and cycloaliphatic types wherein an epoxide monomer is combined with this type of monomer.

Any carbonate salt which can be milled is suitable for a filler according to the invention. Particularly suited are dolomite and calcite milled particles.

For preparing the reactive resin compounds according to the invention, it has been found to be particularly advantageous if the carbonate-containing filler is coated by slurrying it with a solution of one of the foregoing coating compounds dissolved in a solvent such as alcohol or water. Particularly useful as coatings in this solvent process are citric and malic acid. The coating can also be accomplished by sublimation of the multibasic aacid directly onto the filler particles.

The reactive resin compositions according to the invention are useful as immersion resins, casting resin, as an embedment and insulating compound, particularly in electrotechnology. They are used to particular advantage for the manufacture of parts in $SF_6$ technology.

The following examples further illustrate the invention.

EXAMPLE 1

Epoxy Resin-Dolomite-Phthalic Anhydride Compositions with Selected Filler Coatings 1,000 g of a bisphenol-A epoxy resin (EP number: 0.24) was heated to 140° C. To this was added while stirring 2350 g of finely milled dolomite particles which had been treated with a coating medium according to Table 1 and the description following the Table. This mixture was outgassed at 1 mbar for two hours at 140° C. Subsequently, 380 g of a carboxylic acid anhydride mixture heated to 140° C. (phthalic acid anhydride and tetrahydrophthalic acid anhydride in the ratio 1:2) was added as a hardener. This reactive composition was outgassed at 1 mbar at 140° C. for five minutes and was then poured into the molds preheated to 150° C. Hardening of the composition occurred at 150° C. over a period of about sixteen hours. After they had been stored one week at room temperature, standard rods (120 mm×15 mm×10 mm) prepared in this manner were tested for dimensional stability according to Martens, bending strength and impact strength. Rods prepared in a similar fashion but without the filler coating were also tested as a comparative control.

The test results for rods of composition filled with dolomite particles coated with various acids are summarized in Table 1.

TABLE 1

| | Test Results | | |
|---|---|---|---|
| Coating Medium | Dimensional Stability After Martens Degree C | Bending Strength N/mm² | Impact Strength kJ/m² |
| Untreated Rods | 117 | 69 | 5.5 |
| Rods of Composition with filler coated with Boric Acid | 115 | 82 | 6.8 |
| with Phosphoric Acid | 116 | 79 | 7.8 |
| with Succinic Acid | 118 | 81 | 8.2 |
| with Fumaric Acid | 117 | 87 | 7.7 |
| with 2-Hydroxyethane Sulfonic Acid | 118 | 74 | 6.1 |
| with Malic Acid | 115 | 83 | 7.5 |
| with Citric Acid | 115 | 87 | 8.4 |
| with Asparaginic Acid | 116 | 76 | 6.5 |
| with Sulfanil Acid | 110 | 74 | 6.8 |

The coating of the filler was accomplished as follows.

Coating of the Filler

In 800 g ethyl alcohol of distilled water (depending on the dissolving power), 10 g of the coating medium was dissolved. 2,000 g dolomite or calcite particles were saturated with this solution. After three hours, the filler was dried at 100° C. in a circulating-air oven and was subsequently screened. The coating acids used were boric acid, phophoric acid, succinic acid, fumaric acid, 2-hydroxyethane sulfonic acid, malic acid, citric acid, asparaginic acid and sulfanil acid.

For the acids which have solid partial vapor pressures and do not decompose at high temperatures, the coating of the dolomite or calcite particles can also be accomplished by sublimation. In this procedure 2,000 g of the mineral particles, into which 10 g succinic acid or fumaric acid was mixed, were kept at 1 mbar at 150° C. for three hours. The resulting particles were coated with the acid.

EXAMPLE 2

Composition of Diglycidyl Resin-Hexahydrophthalic Anhydride-Calcite with a Citric Acid Coating To 1,000 g of hexahydrophthalic acid diglycidyl ester was added, 900 g melted hexahydrophthalic acid anhydride. After heating to 80° C., 3,800 g of finely milled calcite particles coated with citric acid was stirred-in. To this mixture, was admixed 10 g of a tertiary amine such as triethyl amine as an accelerator. The resulting reactive composition was outgassed at 1 mbar for twenty minutes at 80° C. and then poured into the molds preheated to 80° C. Hardening of this composition occurred over a period of about six hours at 80° C. and ten hours at 140° C.

Standard rods of the composition and a similar filled resin with uncoated filler were prepared and tested as described in Example 1. The test results are summarized in Table 2.

TABLE 2

| | Test Results | | |
|---|---|---|---|
| Coating Medium | Dimensional Stability After Martens Degree C | Bending Strength N/mm² | Impact Strength kJ/m² |
| Rods with uncoated filler | 108 | 67 | 6.7 |
| Rods with filler coated with Citric Acid | 108 | 75 | 7.9 |

EXAMPLE 3

Composition of Cycloaliphatic Epoxy Resin-Hexahydrophthalic Anhydride and Dolomite Coated with Citric Acid To 1,000 g of a cycloaliphatic epoxy resin (3,4-epoxy-cyclohexylmethyl-(3,4-epoxy)cyclohexanecarboxylate) was added 1,050 of melted hexahydrophthalic acid anhydride. After heating this mixture to 180° C., 4,200 g of finely milled dolomite particles coated with citric acid were stirred in. The resulting mixture was additionally combined with 120 g of an alkaline accelerator. This resulting reactive composition was outgassed to 1 mbar for twenty minutes at 80° C. and then poured into molds preheated to 80° C. Hardening of the composition occurred over a period of six hours at 80° C. and ten hours at 140° C.

Standard rods of the composition and a similar filled resin with uncoated filler were prepared and tested as described in Example 1. The test results are given in Table 3.

TABLE 3

| Coating Medium | Test Results | | |
|---|---|---|---|
| | Dimensional Stability After Martens Degree C | Bending Strength N/mm$^2$ | Impact Strength kJ/n$^2$ |
| Rods with Untreated Filler | 166 | 70 | 5.6 |
| Rods with Filler Coated with Citric Acid | 165 | 81 | 6.5 |

What is claimed is:

1. A filled resin composition comprising an epoxy resin hardened with an anhydride hardener and interbonded with carbonate salt filler particles having a coating of a multibasic organic or inorganic acid bonded to the filler particle surfaces.

2. A composition according to claim 1, wherein dolomite is the carbonate filler.

3. A composition according to claim 1, wherein a calcite is the carbonate filler.

4. A composition according to claim 1, wherein the carbonate filler particle coating is a multibasic inorganic acid.

5. A composition according to claim 1, wherein the carbonate filler particle coating is a multibasic organic acid.

6. A composition according to claim 1, wherein the carbonate filler particle coating is succinic acid or fumaric acid.

7. A composition according to claim 1, wherein the carbonate filler particle coating is an organic hydroxy acid.

8. A composition according to claim 1, wherein the carbonate filler particle coating is citric acid or malic acid.

9. A composition according to claim 1, wherein the carbonate filler particle coating is multibasic amino acid.

10. A molding made of a filled, hardened resin composition according to claim 1.

* * * * *